United States Patent
Beck et al.

(10) Patent No.: US 8,292,584 B2
(45) Date of Patent: Oct. 23, 2012

(54) COMPONENT HAVING A FILM COOLING HOLE

(75) Inventors: Thomas Beck, Panketal (DE); Silke Settegast, Berlin (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 13/214,468

(22) Filed: Aug. 22, 2011

(65) Prior Publication Data

US 2011/0300000 A1 Dec. 8, 2011

Related U.S. Application Data

(63) Continuation of application No. 11/918,302, filed as application No. PCT/EP2006/060794 on Mar. 16, 2006, now Pat. No. 8,157,526.

(30) Foreign Application Priority Data

Apr. 12, 2005 (EP) ...................................... 05007993

(51) Int. Cl.
*F01D 5/18* (2006.01)
(52) U.S. Cl. ................................... 416/97 R; 416/241 R
(58) Field of Classification Search ................ 416/97 A, 416/97 R, 241 R; 415/115, 116
See application file for complete search history.

(56) References Cited

U.S. PATENT DOCUMENTS

| 6,183,199 B1 * | 2/2001 | Beeck et al. ................ 416/97 R |
| 6,234,755 B1 * | 5/2001 | Bunker et al. ............... 416/97 R |
| 2005/0173388 A1 * | 8/2005 | Lavers et al. ............ 219/121.71 |

* cited by examiner

*Primary Examiner* — Dwayne J White (57) ABSTRACT

Conventionally coated components with film cooling holes are known, comprising a diffuser, extending through the layers into the substrate. According to the invention, the component is embodied such that the whole diffuser is largely arranged in the layer.

2 Claims, 6 Drawing Sheets

COMPONENT HAVING A FILM COOLING HOLE

CROSS REFERENCE TO RELATED APPLICATIONS

This application is a continuation of U.S. Ser. No. 11/918,302 filed on Oct. 11, 2007 now U.S. Pat. No. 8,157,526. This application is the US National Stage of International Application No. PCT/EP2006/060794, filed Mar. 16, 2006 and claims the benefit thereof. The International Application claims the benefits of European application No. 05007993.8 filed Apr. 12, 2005, all of the applications are incorporated by reference herein in their entirety.

FIELD OF INVENTION

The invention relates to a component having a film cooling hole according to the claims.

BACKGROUND OF THE INVENTION

Components for applications at high temperatures consist of a superalloy with additional protection against oxidation, corrosion and high temperatures. To this end, the substrate of the component comprises a corrosion protection layer on which, for example, an outer ceramic thermal insulation layer is also applied.

Through-holes, out of which a coolant flows on the outer surface and contributes to the film cooling, are also made in the substrate and the layers for additional cooling. The film cooling hole is widened in the vicinity of the outer surface to form a so-called diffuser. When newly producing a component having a film cooling hole, problems arise since the diffuser must be made both through the layers and for the most part in the substrate. During the refurbishment of components, the problem is that the through-hole is already present and the substrate needs to be recoated, so that coating material must subsequently be removed from the diffuser region in the through-hole.

U.S. Pat. No. 4,743,462 discloses a method for closing a film cooling hole, in which a plug consisting of a pin and a spherical head is inserted into the film cooling hole. A bell-shaped indentation is thereby produced inside the coating. The indentation does not serve as a diffuser, however, since it is symmetrically designed.

The functionality of the head furthermore consists in the material of the head evaporating during the coating. It is not therefore possible to produce accurate, reproducible indentations for a multiplicity of film cooling holes.

Similar symmetrical widening of a film cooling hole is disclosed in FIG. 3 of U.S. Pat. No. 6,573,474.

EP 1 350 860 A1 discloses a method for masking a film cooling hole. The material of the masking means is selected so that no coating material is deposited there during the subsequent coating. An accurate, reproducible shape of the indentations inside a layer cannot be produced in this case. Furthermore, a diffuser is not described here.

EP 1 091 090 A2 discloses a film cooling hole in which a groove is made in the layer, so that the groove extends along a plurality of film cooling holes. Neither the film cooling holes nor the groove have a diffuser region.

U.S. Pat. No. 5,941,686 discloses a layer system, in which the substrate is processed. A diffuser region is not disclosed.

EP 1 076 107 A1 discloses a method for masking film cooling holes in which a plug, which protrudes from the hole, is respectively produced in the film cooling hole. To this end air is blown through the film cooling hole in a first step and a coating is applied, a precursor for the plug to be produced subsequently being introduced into the film cooling hole and into the coating. That part of the plug which is arranged inside the temporary layer has its shape determined by how strongly a medium is blown through the film cooling hole and how the coating of the temporary layer is carried out. The shape of that part of the plug which protrudes from the hole is therefore not reproducible.

SUMMARY OF INVENTION

It is therefore an object of the invention to overcome this problem.

The object is achieved by a component as claimed in the claims.

Further advantageous measures, which may arbitrarily be combined with one another in an advantageous way, are listed in the dependent claims.

DETAILED DESCRIPTION OF INVENTION

Figure 1:
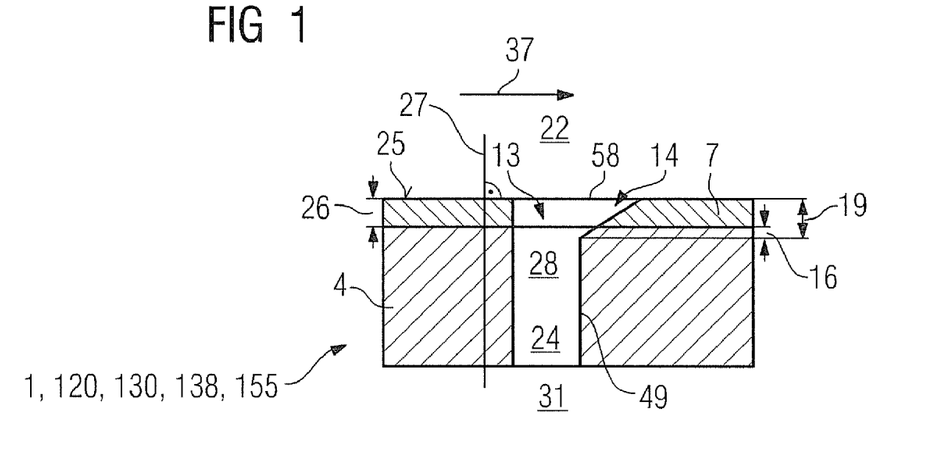
FIGS. 1 to 6 show exemplary embodiments of a component according to the invention having a film cooling hole.

FIG. 1 shows a component 1, 120, 130, 138, 155 consisting of a substrate 4 and a single outer layer 7.

Figure 15:
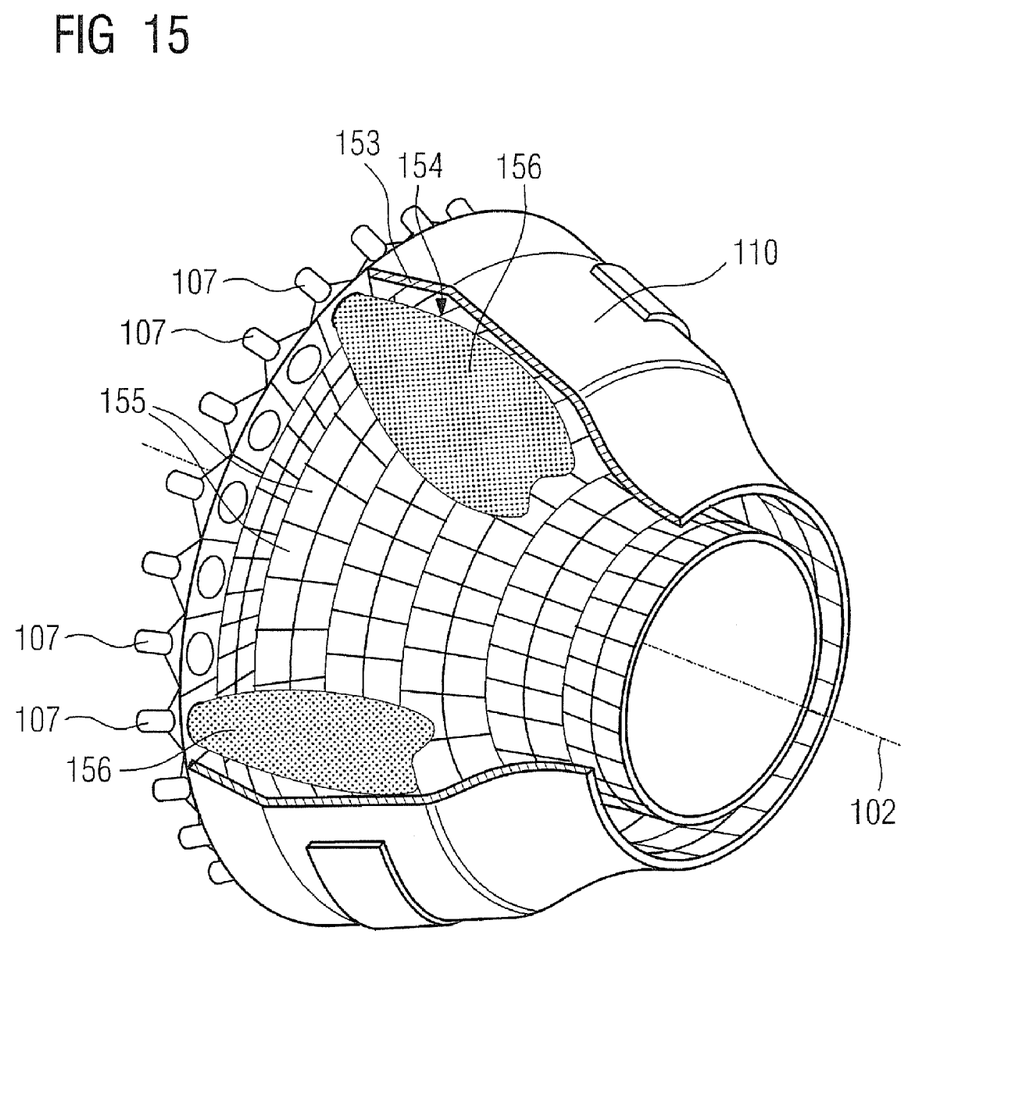
FIG. 15 shows a combustion chamber.

Particularly for components 120, 130, 138, 155 for turbines, the substrate 4 is a superalloy based on iron, nickel and/or cobalt. The outer layer 7 is preferably a corrosion and/or oxidation layer based on an MCrAlX alloy (FIG. 15). It may however also be ceramic.

The substrate 4 and the layer 7 comprise at least one film cooling hole 28 which, on the side 22 which is hot under operational conditions of use, comprises a diffuser 13 which departs from the e.g. cylindrical, square or generally speaking symmetrical contour 49 of the lower part 24 of the film cooling hole 28 near a cooling reservoir 31 and increases in cross section.

The film cooling hole 28 thus consists of a lower part 24 and the outer diffuser 13. The diffuser 13 has an outlet opening 58, over which a hot gas flows in an overflow direction 37.

Figure 2:
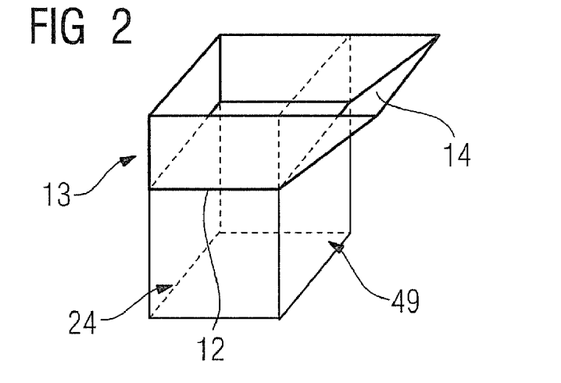

The diffuser 13 is formed from an imaginary extension 12 of the contour 49 as far as the surface 25 and an appendage 14 (FIG. 2), which adjoins one or more side faces of the extension 12.

In the cross-sectional view of FIG. 1, the appendage 14 preferably has a wedge shape.

In the plane of the outer surface, the diffuser 13 thus does not have rotational symmetry, the centroid of the asymmetric shape being displaced in the overflow direction 37 from the centroid of the symmetric shape of the contour 49.

Along the normal 27 to the outer surface 25, that cross-sectional area of the film cooling hole 28 which is perpendicular to the normal 27 becomes greater, i.e. the diffuser 13 is fully or preferably partially designed with a funnel shape.

According to the invention, the diffuser 13 is arranged for the most part inside the single layer 7, i.e. when the diffuser 13 extends with an overall length 19 into the depth along a normal 27 of the component 1 which is perpendicular to the outer surface 25 or perpendicular to the overflow direction 37, then there is a substrate length 16 of the diffuser 13 which constitutes the proportion of the diffuser 13 in the substrate 4. The substrate length 16 is designed to be significantly less than the overall length 19. The overall coating thickness 26 (here that of the layer 7) forms the remaining part of the overall length 19 of the diffuser 13. The coating thickness 26 is at least 50%, preferably at least 60% or at least 70%, in particular 80% or 90% of the overall length 19.

Figure 3:
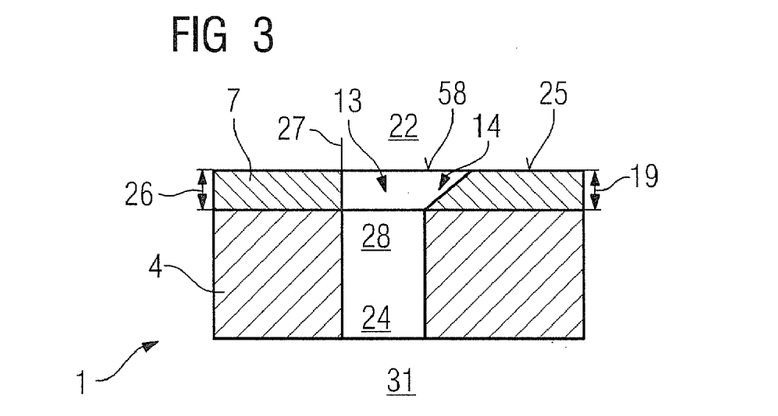

As an alternative, the diffuser 13 may be arranged entirely in the single layer 7 (FIG. 3, layer thickness 26=overall length 19).

Figure 4:
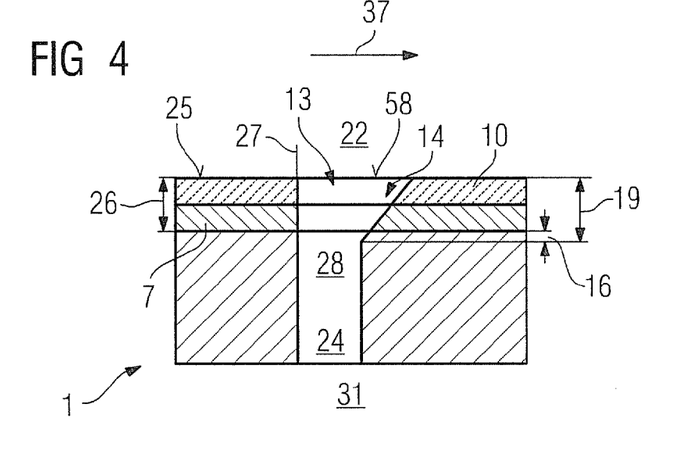

In FIG. 4, there are two layers on the substrate 4.

These are in turn a corrosion and oxidation protection layer 7, on which an outer ceramic thermal insulation layer 10 is also applied.

As in FIG. 1, there are lengths 16, 19 of the diffuser 13, the layer thickness 26 again constituting at least 50%, 60% or in particular 70%, in particular 80% or 90% of the overall length 19.

Figure 5:
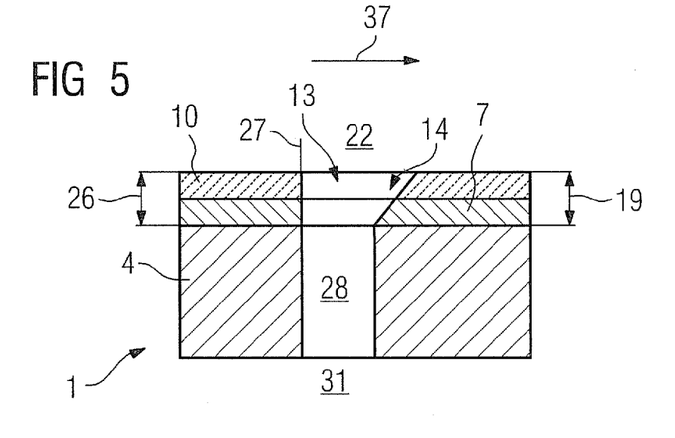

The diffuser 13 may likewise be arranged entirely in the two layers 7, 10 (FIG. 5).

Correspondingly as for the two layers according to FIGS. 4, 5, this also applies for three or more layers.

The fact that the diffuser 13 is arranged for the most part or entirely in the layers 7, 10 provides advantages for refurbishing the component 1, for example in respect of laser erosion or removal of material, above the lower part 24, which covers the outlet opening 58 after recoating of the component 1, specifically in that the laser or other coating apparatus only needs to be adjusted for the material of the layers 7, 10 and processing of the other material, i.e. that of the substrate 4, does not need to be taken into account.

Figure 6:
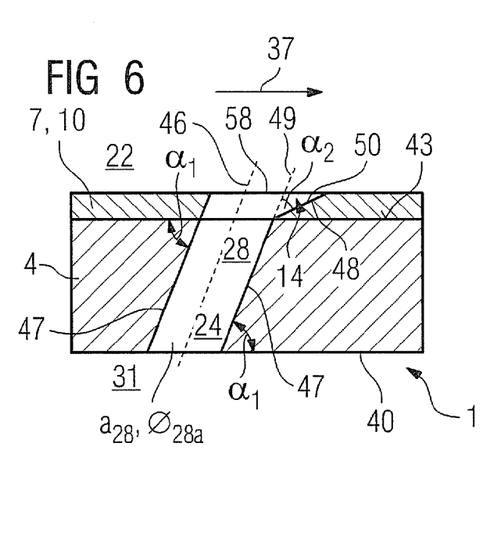

FIG. 6 shows a cross section through a component 1 having a film cooling hole 28.

The substrate 4 comprises an outer surface 43, on which the at least one layer 7, is applied.

The diffuser 13 is for example arranged for the most part (according to FIGS. 1, 3, 4, 5) in the layer 7, 10, although it may also exist entirely in the substrate 4 or for the most part in the substrate 4.

The lower part 24 of the film cooling hole 28 comprises for example a symmetry line 46 in longitudinal section.

The symmetry line 46 also constitutes for example an outflow direction 46 for a coolant, which flows through the cooling hole 28.

A contour line 47, which extends parallel to the symmetry line 46 on the inner side of the film cooling hole 28 or represents a projection of the symmetry line 46 onto the inner side of the lower part 24 of the film cooling hole 28, makes an acute angle $\alpha 1$ with the outer surface 43, which is in particular 30°+/−10%. The film cooling hole 28 is thus inclined in the overflow direction 37.

The edge length $a_{28}$ (FIG. 8) or the diameter $\phi_{28}$ of the film cooling hole 28 is for example about 0.62 mm or 0.7 mm for a rotor blade and about 0.71 mm or 0.8 mm for guide vanes.

The contour line 47, which preferably extends parallel to the outflow direction 46 along the contour 49 of the lower part 24, makes an acute angle $\alpha 2$ with a diffuser line 48 which extends on the inner face 50 of the appendage 14 of the diffuser 13, and which represents a projection of the overflow direction 37 onto the inner face 50 of the appendage 14 of the diffuser 13.

The angle $\alpha 2$ is in particular 10°+/−10%.

Along the symmetry line 46, the lower part 24 has a constant cross section which comprises in particular n-fold rotational symmetry (square, rectangular, round, oval, . . . ).

The diffuser 13 is created by the cross-sectional area of the film cooling hole 28 widening, i.e. being designed with a funnel shape in cross section. The appendage 14 to the contour 49 does not necessarily extend entirely around the outlet opening 58 of the film cooling hole 28, rather only partially, in particular over half or less of the circumference of the outlet opening 58.

Figure 7:
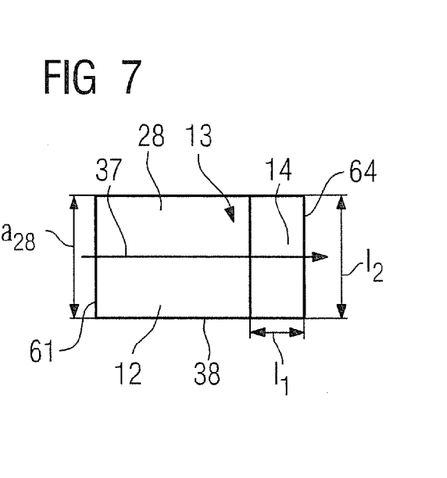
FIGS. 7, 8 show a plan view of a film cooling hole according to the invention.

The diffuser 13 is preferably arranged only—as seen in the overflow direction 37 of the hot gas 22—in the rear region of the opening 58 (FIG. 7). Side lines 38 of the diffuser 13 or of the appendage 14 extend for example parallel to the overflow direction 37 in plan view (FIG. 7).

The overall layer thickness of the at least one layer 7, 10 is from about 400 μm to 700 μm, in particular 600 μm.

Figure 8:
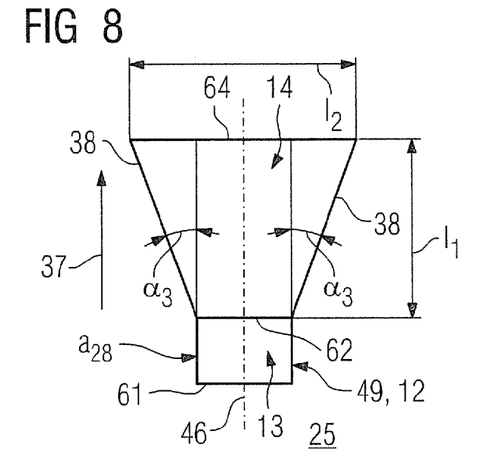

FIG. 8 shows another configuration of the film cooling hole 28 and a plan view of the diffuser 13 in the plane of the outer surface 25 of the layer system or component 1.

The appendage 14 has, for example, a trapezoidal shape in the plane of the outer surface 25.

In the plane of the surface 25, the appendage 14 of the diffuser 13 has a longitudinal length $l_1$ of preferably about 3 mm in the overflow direction 37.

The greatest width i.e. the greatest transverse length $l_2$ of the diffuser 13 in the surface, i.e. measured perpendicularly to the overflow direction 37, preferably has a size of 2+−0.2 mm for rotor blades and a size of 4+−0.2 mm for guide vanes, and is at most 8 mm.

In the exemplary embodiment of FIG. 8, the widening of the diffuser 13 begins on a widening front edge 62, i.e. at the appendage 14, and widens in the overflow direction 37.

The overflow direction 37 makes an acute angle $\alpha 3$, in particular 10°+/−10%, with a lateral delimiting line 38 of the appendage 14 in the plane of the outer surface 25.

The diffuser 13 preferably widens departing from the contour 49 of the lower part 24, which is for example symmetrical with respect to two mutually perpendicular axes, transversely to the flow direction 37 in each case by an angle $\alpha 3$, which is in particular 10°+/−10%, in which case the widening already begins on a leading edge 61 (as seen in the overflow direction 37) of the film cooling hole 28 and extends as far as the trailing edge 64.

Figure 9:
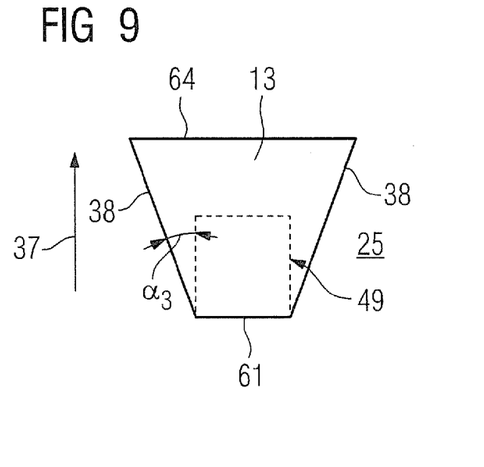
FIGS. 9 to 13 show configurations of a film cooling hole.

The diffuser 13 therefore has a trapezoidal cross section in the plane of the surface 25 (FIG. 9).

The diffuser 13 is produced by a material erosion method, for example electron bombardment or laser irradiation. Only in this way can a multiplicity of cooling holes be produced accurately and reproduced.

FIGS. 10, 11, 12 and 13 show various contours of the film cooling hole 28.

The lower part 24 of the film cooling hole 28 is designed to be cuboid here, merely by way of example, although it may also have a round or oval cross-sectional shape.

Figure 10:
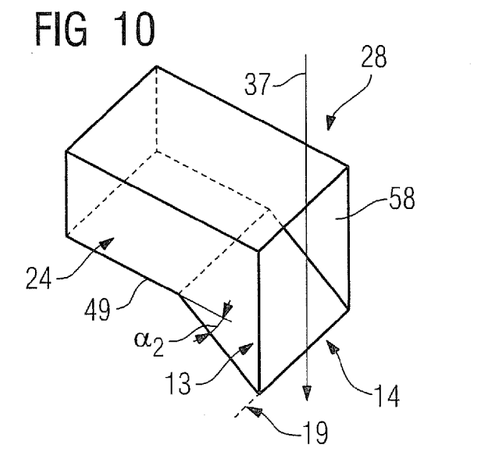

The diffuser 13 in FIG. 10 is lengthened for example only in the overflow direction 37, so that the cross section of the outlet opening 58 is greater than the cross section of the lower part 24. The film cooling hole 28 thus corresponds to the film cooling hole according to FIG. 2, 6 or 7.

Figure 11:
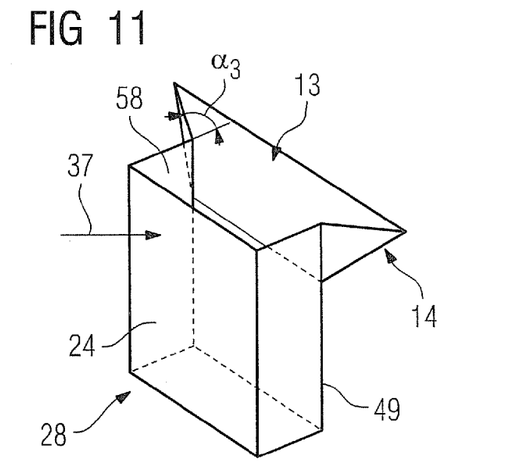

Based on FIG. 10, FIG. 11 represents a film cooling hole 28 which is also widened in the overflow direction 37 transversely to the overflow direction 37, i.e. it corresponds to FIG. 8.

Figure 12:
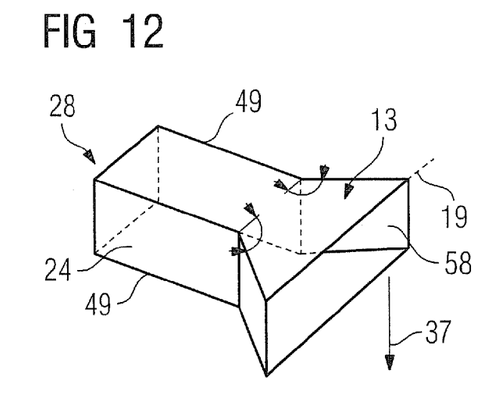

The diffuser 13 in FIG. 12 is lengthened for example only transversely to the overflow direction 37, so that here again the cross section of the outlet opening 58 is greater than the cross section of the lower part 24.

The film cooling hole 28 consists for example of a cuboid lower part 24, which is adjoined by a diffuser 13 in the form of a hexahedron with parallel trapezoidal side faces.

Figure 13:
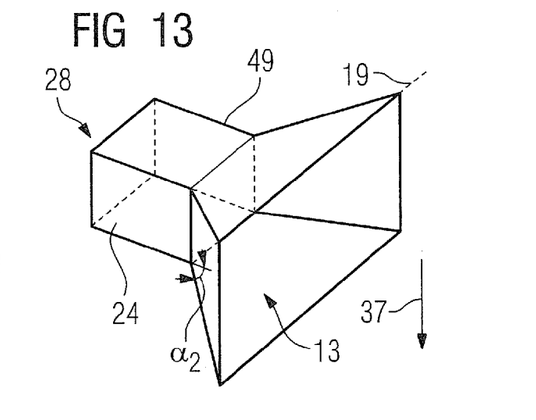

The diffuser 13 in FIG. 13 is widened both only in the overflow direction 37 and in both directions transversely to the overflow direction 37.

FIGS. 6, 7, 8, 9, 10, 11 and 13 respectively show that the diffuser 13 is for the most part arranged behind the outlet opening 58, as seen in the overflow direction 37.

This means that the diffuser 13 is formed by an asymmetric widening as seen in the overflow direction 37. Uniform widening of the cross section of the lower part 24 of the film cooling hole 28 at the level of the outer surface 25 is not desired.

It can be seen clearly in FIG. 6, and is correspondingly described, that the appendage 14 represents a widening of the cross section in the overflow direction 37 so that the diffuser is formed. This is also shown by the plan view of FIG. 6 according to FIG. 7.

In FIG. 8, the widening of the aperture of the cross section of the film cooling hole in the overflow direction 37 begins from the line 62.

In FIG. 9, the widening of the diffuser 13 already begins on the leading edge 61 as seen in the overflow direction 37.

Widening of the cross section of the film cooling hole 28 at the level of the outer surface 25 against the flow direction 37, i.e. before the leading edge 61, is not present or is present only to a small extent compared with the widening of the cross section in the overflow direction 37.

Figure 14:
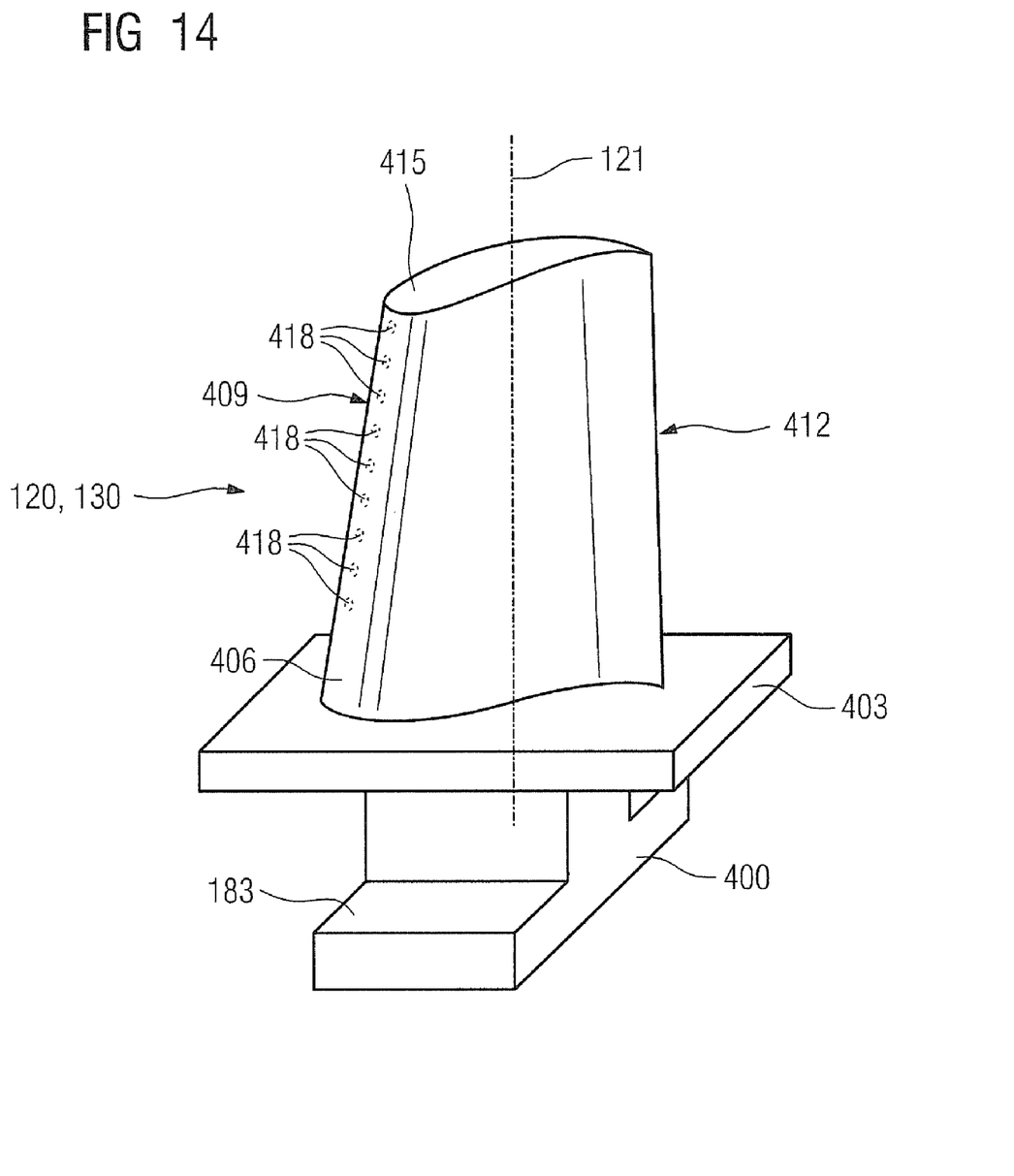
FIG. 14 shows a turbine blade.

FIG. 14 shows a perspective view of a rotor blade 120 or guide vane 130 of a turbomachine, which extends along a longitudinal axis 121.

The turbomachine may be a gas turbine of an aircraft or of a power plant for electricity generation, a steam turbine or a compressor.

Successively along the longitudinal axis 121, the blade 120, 130 comprises a fastening region 400, a blade platform 403 adjacent thereto and a blade surface 406.

As a guide vane 130, the vane 130 may have a further platform (not shown) at its vane tip 415.

A blade root 183, which is used to fasten the rotor blades 120, 130 on a shaft or a disk (not shown), is formed in the fastening region 400.

The blade root 183 is configured, for example, as a hammerhead. Other configurations as a firtree or dovetail root are possible.

The blade 120, 130 comprises a leading edge 409 and a trailing edge 412 for a medium which flows past the blade surface 406.

In conventional blades 120, 130, for example, solid metallic materials, in particular superalloys, are used in all regions 400, 403, 406 of the blade 120, 130.

Such superalloys are known, for example, from EP 1 204 776 B1, EP 1 306 454, EP 1 319 729 A1, WO 99/67435 or WO 00/44949; these documents are part of the disclosure in respect of the chemical composition of the alloy.

The blades 120, 130 may in this case be manufactured by a casting method, also by means of directional solidification, by a forging method, by a machining method or combinations thereof.

Workpieces with a monocrystalline structure or structures are used as components for machines which are exposed to heavy mechanical, thermal and/or chemical loads during operation.

Such monocrystalline workpieces are manufactured, for example, by directional solidification from the melt. These are casting methods in which the liquid metal alloy is solidified to form a monocrystalline structure, i.e. to form the monocrystalline workpieces, or directionally.

Dendritic crystals are in this case aligned along the heat flux and form either a rod-crystalline grain structure (columnar, i.e. grains which extend over the entire length of the workpiece and in this case, according to general terminology usage, are referred to as directionally solidified) or a monocrystalline structure, i.e. the entire workpiece consists of a single crystal. It is necessary to avoid the transition to globulitic (polycrystalline) solidification in this method, since non-directional growth will necessarily form transverse and longitudinal grain boundaries which negate the good properties of the directionally solidified or monocrystalline component.

When directionally solidified structures are referred to in general, this is intended to mean both single crystals which have no grain boundaries or at most small-angle grain boundaries, and also rod-crystal structures which, although they do have grain boundaries extending in the longitudinal direction, do not have any transverse grain boundaries. These latter crystalline structures are also referred to as directionally solidified structures.

Such methods are known from U.S. Pat. No. 6,024,792 and EP 0 892 090 A1; these documents are part of the disclosure.

The blades 120, 130 may likewise comprise coatings against corrosion or oxidation, for example (MCrAlX; M is at least one element from the group iron (Fe), cobalt (Co), nickel (Ni), X is an active element and stands for yttrium (Y) and/or silicon and/or at least one rare-earth element, for example hafnium (Hf)). Such alloys are known, for example, from EP 0 486 489 B1, EP 0 786 017 B1, EP 0 412 397 B1 or EP 1 306 454 A1, which are intended to be part of this disclosure in respect of the chemical composition of the alloy.

On the MCrAlX, there may also be a thermal insulation layer which consists for example of $ZrO_2$, $Y_2O_3$—$ZrO_2$, i.e. it is non-stabilized or partially or fully stabilized by yttrium oxide and/or calcium oxide and/or magnesium oxide.

Rod-shaped grains are generated in the thermal insulation layer by suitable coating methods, for example electron beam deposition (EB-PVD).

Refurbishment means that components 120, 130 may need to have protective layers removed from them after their use (for example by sandblasting). Corrosion and/or oxidation layers or products are then removed. Optionally, cracks in the component 120, 130 will also be repaired. The component 120, 130 is then recoated and the component 120, 130 is used again.

The blade 120, 130 may be designed to be a hollow or solid. If the blade 120, 130 is intended to be cooled, it will be hollow and optionally also comprise film cooling holes 418 (represented by dashes).

FIG. 15 shows a combustion chamber 110 of a gas turbine 100. The combustion chamber 110 is designed for example as a so-called ring combustion chamber, in which a multiplicity of burners 107 arranged in the circumferential direction around a rotation axis 102, which produce flames 156, open into a common combustion chamber space 154. To this end, the combustion chamber 110 in its entirety is designed as an annular structure which is positioned around the rotation axis 102.

In order to achieve a comparatively high efficiency, the combustion chamber 110 is designed for a relatively high temperature of the working medium M, i.e. about 1000° C. to 1600° C. In order to permit a comparatively long operating time even under these operating parameters which are unfavorable for the materials, the combustion chamber wall 153 is provided with an inner lining formed by heat shield elements 155 on its side facing the working medium M.

Each heat shield element 155 made of an alloy is equipped with a particularly heat-resistant protective layer on the working medium side (MCrAlX layer and/or ceramic coating), or is made of refractory material (solid ceramic blocks).

These protective layers may be similar to the turbine blades, i.e. for example MCrAlX means: M is at least one element from the group iron (Fe), cobalt (Co), nickel (Ni), X is an active element and stands for yttrium (Y) and/or silicon and/or at least one rare-earth element, for example hafnium (Hf). Such alloys are known, for example, from EP 0 486 489 B1, EP 0 786 017 B1, EP 0 412 397 B1 or EP 1 306 454 A1, which are intended to be part of this disclosure in respect of the chemical composition of the alloy.

On the MCrAlX, there may also be an e.g. ceramic thermal insulation layer which consists for example of $ZrO_2$, $Y_2O_3$—$ZrO_2$, i.e. it is non-stabilized or partially or fully stabilized by yttrium oxide and/or calcium oxide and/or magnesium oxide.

Rod-shaped grains are generated in the thermal insulation layer by suitable coating methods, for example electron beam deposition (EB-PVD).

Refurbishment means that heat shield elements 155 may need to have protective layers removed from them after their use (for example by sandblasting). Corrosion and/or oxidation layers or products are then removed. Optionally, cracks in the heat shield element 155 will also be repaired. The heat shield elements 155 are then recoated and the heat shield elements 155 are used again.

Owing to the high temperatures inside the combustion chamber 110, a cooling system is also provided for the heat shield elements 155 or their holding elements. The heat shield elements 155 are then for example hollow and optionally also comprise cooling holes (not shown) opening into the combustion chamber space 154.

Figure 16:
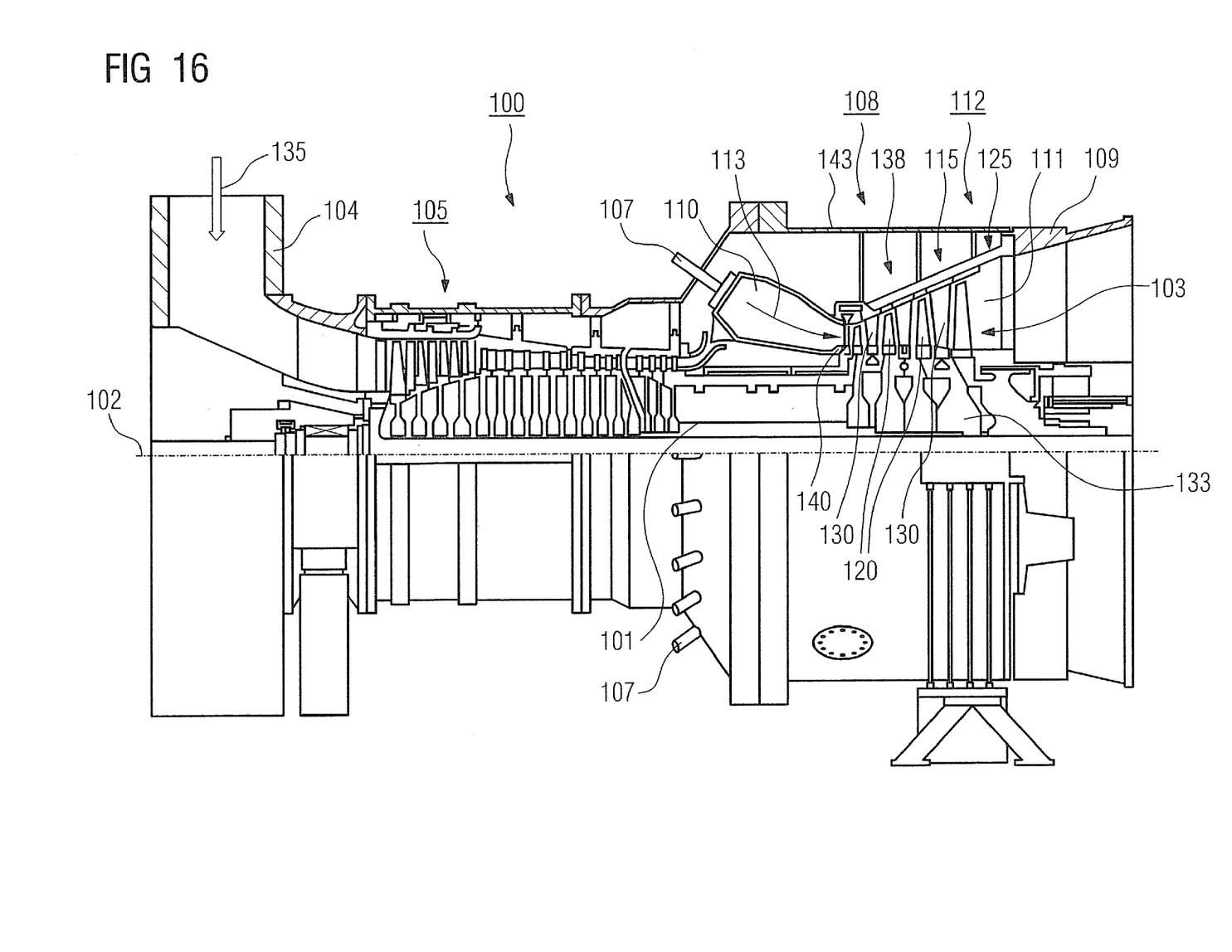
FIG. 16 shows a gas turbine.

FIG. 16 shows by way of example a gas turbine 100 in a longitudinal partial section.

The gas turbine 100 internally comprises a rotor 103, or turbine rotor, mounted so that it can rotate about a rotation axis 102 and having a shaft 101.

Successively along the rotor 103, there are an intake manifold 104, a compressor 105, an e.g. toroidal combustion chamber 110, in particular a ring combustion chamber, having a plurality of burners 107 arranged coaxially, a turbine 108 and the exhaust manifold 109.

The ring combustion chamber 110 communicates with an e.g. annular hot gas channel 111. There, for example, four successively connected turbine stages 112 form the turbine 108.

Each turbine stage 112 is for example foamed by two blade rings. As seen in the flow direction of a working medium 113, a row 125 formed by rotor blades 120 follows in the hot gas channel 111 of a guide vane row 115.

The guide vanes 130 are fastened on the stator 143 while the rotor blades 120 of a row 125 are fitted on the rotor 103, for example by means of a turbine disk 133.

Coupled to the rotor 103, there is a generator or a work engine (not shown).

During operation of the gas turbine 100, air 135 is taken in by the compressor 105 through the intake manifold 104 and compressed. The compressed air provided at the turbine-side end of the compressor 105 is delivered to the burners 107 and mixed there with a fuel. The mixture is then burnt to form the working medium 113 in the combustion chamber 110. From there, the working medium 113 flows along the hot gas channel 111 past the guide vanes 130 and the rotor blades 120. At the rotor blades 120, the working medium 113 expands by imparting momentum, so that the rotor blades 120 drive the rotor 103 and the work engine coupled to it.

During operation of the gas turbine 100, the components exposed to the hot working medium 113 experience thermal loads. Apart from the heat shield elements lining the ring combustion chamber 110, the guide vanes 130 and rotor blades 120 of the first turbine stage 112, as seen in the flow direction of the working medium 113, are thermally loaded most greatly.

In order to withstand the temperatures prevailing there, they may be cooled by means of a coolant.

The substrates may likewise comprise a directional structure, i.e. they are monocrystalline (SX structure) or comprise only longitudinally directed grains (DS).

Iron-, nickel- or cobalt-based superalloys, for example, are used as material for the components, in particular for the turbine blades and vanes 120, 130 and components of the combustion chamber 110.

Such superalloys are known, for example, from EP 1 204 776 B1, EP 1 306 454, EP 1 319 729 A1, WO 99/67435 or WO 00/44949; these documents are part of the disclosure in respect of the chemical composition of the alloy.

The blades and vanes 120, 130 may likewise comprise coatings against corrosion (MCrAlX; M is at least one element in the group iron (Fe), cobalt (Co), nickel (Ni), X is an active element and stands for yttrium (Y) and/or silicon, and/or at least one rare-earth element or hafnium). Such alloys are known, for example, from EP 0 486 489 B1, EP 0 786 017 B1, EP 0 412 397 B1 or EP 1 306 454 A1, which are intended to be part of this disclosure in respect of the chemical composition of the alloy.

On the MCrAlX, there may also be a thermal insulation layer, which consists for example of $ZrO_2$, $Y_2O_3$—$ZrO_2$, i.e. it is non-stabilized or partially or fully stabilized by yttrium oxide and/or calcium oxide and/or magnesium oxide.

Rod-shaped grains are generated in the thermal insulation layer by suitable coating methods, for example electron beam deposition (EB-PVD).

The guide vanes 130 comprise a guide vane root (not shown here) facing the inner housing 138 of the turbine 108, and a guide vane head lying opposite the guide vane root. The guide vane head faces the rotor 103 and is fixed on a fastening ring 140 of the stator 143.

We claim:

1. A component having a film cooling hole, comprising:
   a component substrate; and
   a layer arranged on the substrate where the film cooling hole comprises a diffuser in an outer region and a hot gas flows over the film cooling hole in an overflow direction, the film cooling hole comprising a lower part, and the diffuser adjoins the lower part as part of the film cooling hole and
   wherein,
   the diffuser is substantially arranged in the layer,
   the overall coating thickness is 60% of an overall length of the diffuser as measured along a normal to the outer surface of the layer includes a first length which is completely arranged in an overall coating thickness and a second length which is arranged in the substrate whereby the first length is significantly less than the second length,
   the diffuser widens in the plane of the outer surface of the layer in the overflow direction at an angle to the overflow direction transversely to the overflow direction,
   wherein the diffuser consists of a continuation of the contour of the lower part and an appendage, and only the appendage of the diffuser widens toward the outer surface so that it is shaped trapezoidally in the outer surface, and wherein the diffuser has a longitudinal length in the plane of the outer surface in the overflow direction equal to 3 mm, wherein a greatest transverse length of the diffuser in the plane of the outer surface measured perpendicularly to the overflow direction includes a first size of 2+−0.2 mm for rotor blades and a second size of 4+−0.2 mm for guide vanes, wherein the widening of diffuser begins on a widening front edge, at the appendage, and widens in the overflow direction, and wherein the overflow direction makes an acute angle with a lateral delimiting line of the appendage in the plane of the outer surface.

2. The component as claimed in claim 1, wherein the acute angle is 10°±10°.

* * * * *